(12) United States Patent
Robison et al.

(10) Patent No.: US 10,999,359 B2
(45) Date of Patent: May 4, 2021

(54) CONNECTION SERVICE DISCOVERY AND LOAD REBALANCING

(71) Applicant: eBay Inc., San Jose, CA (US)

(72) Inventors: Timothy David Robison, Folsom Orangevale, CA (US); Steven Bruce West, Roseville, CA (US); Sarang Mukund Kulkarni, Folsom, CA (US); Douglas Wayne Hathaway, El Dorado Hills, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/510,781

(22) Filed: Jul. 12, 2019

(65) Prior Publication Data
US 2021/0014302 A1 Jan. 14, 2021

(51) Int. Cl.
*H04L 29/08* (2006.01)
(52) U.S. Cl.
CPC ........ *H04L 67/101* (2013.01); *H04L 67/1008* (2013.01); *H04L 67/1029* (2013.01); *H04L 67/141* (2013.01)
(58) Field of Classification Search
CPC .......... H04L 67/00–67/42; H04L 65/00–65/80
See application file for complete search history.

(56) References Cited

U.S. PATENT DOCUMENTS

| 6,779,017 | B1* | 8/2004 | Lamberton | ............. | G06F 9/505 709/203 |
| 7,269,607 | B2 | 9/2007 | Cotner et al. | | |
| 8,413,156 | B2 | 4/2013 | Kasten et al. | | |
| 8,504,522 | B2 | 8/2013 | Wu et al. | | |
| 8,732,191 | B2 | 5/2014 | Somogyi et al. | | |
| 8,874,609 | B1 | 10/2014 | Singh et al. | | |
| 8,943,181 | B2 | 1/2015 | Kasten et al. | | |
| 9,390,130 | B2 | 7/2016 | Kakarlamudi et al. | | |
| 2002/0049842 | A1* | 4/2002 | Huetsch | ............. | H04L 67/1008 709/225 |
| 2014/0310418 | A1* | 10/2014 | Sorenson, III | ........ | H04L 67/288 709/226 |

(Continued)

OTHER PUBLICATIONS

Schaumann, Jan, "L3DSR-Overcoming Layer 2 Limitations of Direct Server Return Load Balancing," Jan. 30, 2011, Norther American Network Operators' Group 51, Miami, pp. 1-33 (Year: 2011).*

Primary Examiner — Clayton R Williams
(74) Attorney, Agent, or Firm — FIG. 1 Patents

(57) ABSTRACT

In a networked data system, a discovery protocol enables clients to establish connections to one a plurality of database servers to utilize a distributed connection service. The service manages connections between application servers, i.e. clients, and databases. An initial request from the client is received by a load balancer. The load balancer responds to the client by identifying an assigned connection to one of the database servers based on load considerations. The client sends a secondary request directly to the assigned connection, bypassing the load balancer. The service establishes a persistent link on the assigned connection and assigns a time-to-live (TTL), during which the service connects data requests to the databases. Upon expiration of the TTL, the service completes a next data request received, then notifies the client that the connection is no longer valid, thereby requiring a new connection through the load balancer and rebalancing system traffic.

20 Claims, 7 Drawing Sheets

(56) References Cited

U.S. PATENT DOCUMENTS

| | | | |
|---|---|---|---|
| 2016/0224392 A1* | 8/2016 | Clarke | G06F 9/5083 |
| 2018/0019922 A1 | 1/2018 | Robison et al. | |
| 2018/0219783 A1* | 8/2018 | Pfister | H04L 67/1023 |
| 2019/0312931 A1* | 10/2019 | Greenwood | G06F 16/951 |
| 2019/0342398 A1 | 11/2019 | Kasten et al. | |

* cited by examiner

CONNECTION SERVICE DISCOVERY AND LOAD REBALANCING

BACKGROUND

The popularity of Web-based services and applications has resulted in growing demand upon networks and database equipment supporting them. Users generally interact with a web site through an application server which connects through a database server to a database to retrieve needed data. The number of needed application servers and corresponding connections to databases has been increasing at a rapid rate, in keeping with demand. One way of expanding capacity is horizontal scaling, i.e., the addition of machines in a functional tier, which is effective but expensive. Therefore, techniques are also employed to expand traffic handling capabilities and connection usage within existing hardware, for example through connection pooling and multiplexing. Further, it is important in high traffic data systems with fleets of servers to balance loading across machines to distribute loads for system stability. To this end, load balancing distributes connection loading across a multiple server nodes, which helps prevent individual machines from becoming overloaded and avoids routing client requests to unavailable machines. However, load balancing also introduces certain disadvantages. When functioning, a load balancer introduces latency, and when not functioning it is a point of failure that can result in no connections to the servers it was balancing, disrupting service to customers.

Thus, there is a need for improvement in connection management efficiency in large data systems.

SUMMARY

Techniques described herein provide a highly efficient connection service is operated in a distributed manner on a plurality of database server machines. Within a networked data system, the connection service manages connections between application servers and databases that can fulfill data requests from the application servers. In an embodiment, a protocol enables each application server to discover the connection service establishes using a two-step handshake, resulting in a load-balanced assignment of a service connection over which the application server establishes a persistent connection to a service node, i.e., one of the database servers. The application server can utilize the persistent connection to send multiple data requests for a period during without additional load balancing and, of course, without a need to establish a new connection to a database server.

In practice, a large data system experiences an organic ebb and flow of traffic that leads to a loading variation across tiered servers. To promote stability, techniques are provided herein for the connection service to drive a rebalancing of traffic across the database servers. In some embodiments herein, for example, a TTL is set for a client connection to the database server to end persistence upon expiration, causing the app server to again request a new connection from the service through the load balancer. In this way, new connection requests are beneficially balanced the load across the database servers, then the persistence of the connection enables the fulfillment of numerous data requests without load balancing operations, thereby reducing the latency and processing expense of load balancing. Beneficially, in an embodiment, the database server fulfill a next data request received after TTL expiration, concurrently notifying the application server the connection is no longer valid. This drives rebalancing connections gracefully, avoiding failed connections or error codes if the connection were merely rejected.

When deployed in a large data system, the techniques described herein combine system stability advantages of connection load balancing with service efficiency of persistent connections.

It should be appreciated that the subject matter described above and in further detail below can be implemented as a computer-controlled apparatus, a computer-implemented method, a computing device, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
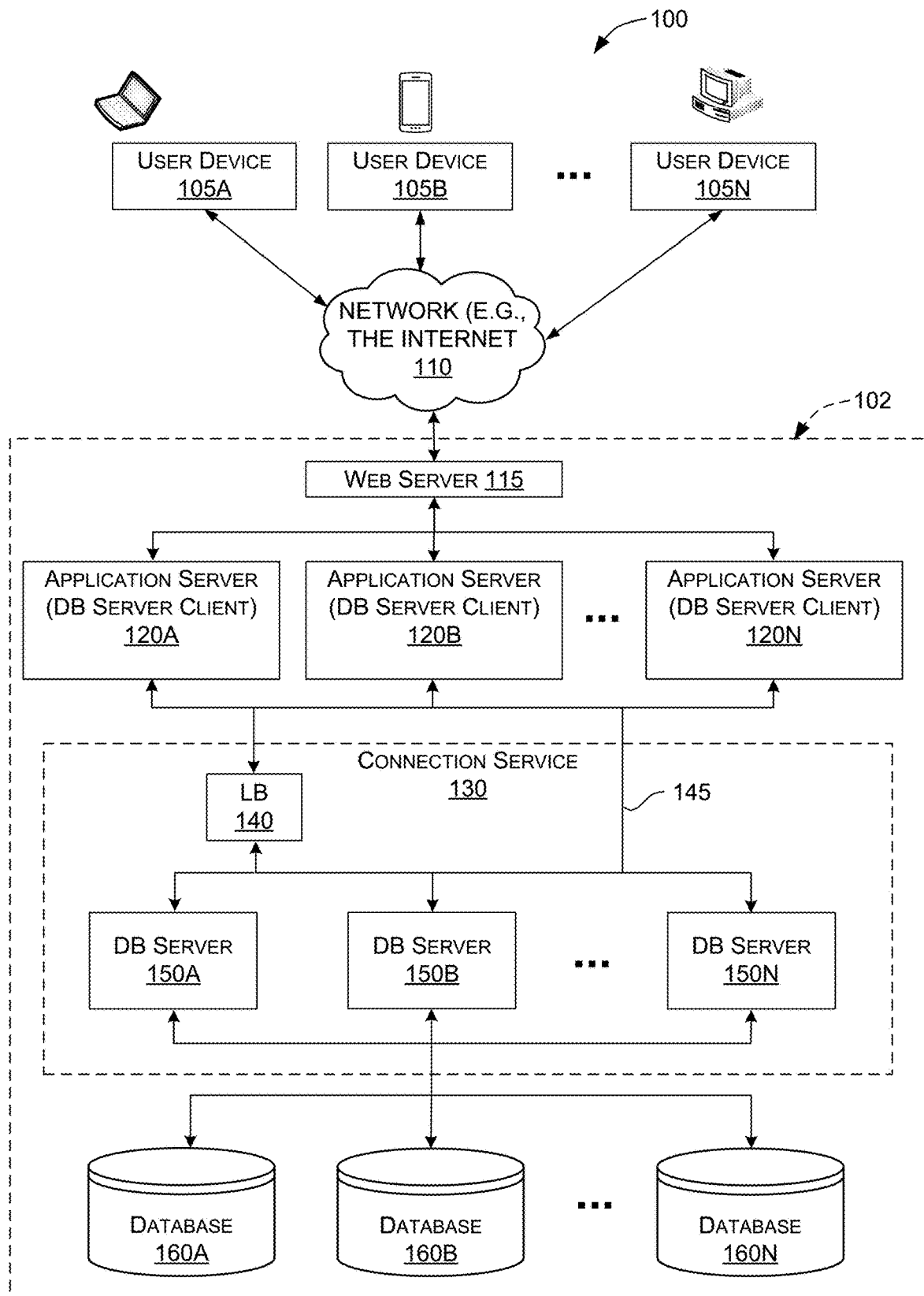
FIG. 1 is a schematic diagram illustrating a networked system, according to some example embodiments.

The following Detailed Description presents techniques for service discovery within a networked system that employs a multiple-step handshake for clients to connect to a service. According to one embodiment, the system includes a plurality of client devices, such as application servers, requesting connections to databases, and a connection service is provided at an intermediate tier to manage connections between the client devices and the databases. The connection service operates on a fleet of nodes or servers and may operate the service as a distributed application. The service discovery described herein, according to one embodiment, employs initial load balancing to assign a connection to one of the servers based on server load metrics, and subsequently enables a client to connect directly to the assigned connection for a persistent session period. In some implementations the connection occasionally times out, causing the client to repeat the discovery process.

These disclosed technologies enhance overall efficiency of the system. For example, stability of the servers operating the service is maintained through by balancing the load when assigning initial connections to clients. In addition, efficient and fast client interaction with the service is realized by enabling the persistent link on the assigned connection as a client uses the service, such as to send multiple data requests to the service to retrieve resources during a period of time without going through a load balancing operation except on the initial request. Moreover, overall system stability is promoted over time by causing the clients to occasionally rediscover the service through the load balancer, thereby continually rebalancing traffic across service nodes.

As mentioned above, the increasing use demands on web sites has resulted in a rapid increase in the connections to databases that support such sites. Systems have been scaled horizontally by adding equipment, such as application servers, yet there is a constant demand to drive additional traffic capacity. Database design limitations present scaling issues as well, as a particular database typically has a limited number of possible connections, yet adding database instances is expensive and complex. Connections to databases require substantial memory, and opening and closing connections is demanding on resources. Multiplexing and connection pooling techniques can be utilized to manage database connections more efficiently, allowing clients to share open connections for shared resources, and allowing database connections to be closed or opened based on demand. In this way, more client data requests can be completed using fewer database connections. Such techniques can be employed to manage connections for requests from an application server to realize efficiency for those local requests, however in a large data system connection pooling and multiplexing will yield optimal benefits through a service that manages all requests between application servers and databases. In one embodiment, the connection service described herein manages connections between all application servers and databases, utilizing connection pooling and multiplexing to leverage scalability by minimizing a need for open database connections and by efficiently opening and closing database connections as needed to satisfy demand.

FIG. 1 illustrates an example embodiment of a network architecture 100. One or more user devices 105A-N connect via a network 110 (e.g., the Internet or wide area network (WAN)) to a networked system 102. The networked system 102 can be, for example, within a data center. Although only three user devices 105A, 105B and 105N are illustrated in FIG. 1, the network architecture 100 can accommodate communication with many user devices. The user device 105A-N can be a computing device capable of executing applications and interacting with web services. Any one of the user devices 105A-N can be, for example, a smart phone, a laptop, desktop computer, tablet, work station, Internet appliance, wireless device, wearable device, smart TV, game console, and so forth. In some embodiments, the user devices 105A-N can utilize a web client to access the various systems of the networked system 102 via the web interface supported by a web server 115. Some user devices may execute a programmatic client to accesses various services and functions provided by the networked system 102 via a programmatic interface provided by an Application Program Interface (API) server.

Through an interfacing server such as the web server 115, the user devices 105A-N interact with a plurality of application servers 120A-N. Within the networked system 102, each of the application servers 120A-N is a client with respect to a plurality of database servers 150A-N, as will be described in greater detail below. The terms client and application server are interchangeable with respect to embodiments described herein. Each of the application servers 120A-N manages operations between user devices and backend services of the networked system 102, for example, managing data requests and requesting connections to access resources that can fulfill those requests. Although three application servers 120A, 120B, 120N are illustrated in FIG. 1, it will be understood that the networked system 102 may include many application servers 120A-N.

The application servers 120A-N are, in turn, networked with a plurality database servers 150A-N which manage connections to a plurality of databases 160. In a preferred implementation, the database servers 150A-N are similarly configured machines so as to operate a distributed connection service 130 by which the service has visibility and control over all connections to the application servers 120A-N and all connections to the databases 160. Such an implementation enables the connection service 130 to coordinate and utilize a common connection pool to multiplex data requests and manage connections to the databases 160. The terms service node and database server are interchangeable as used herein.

Still referring to FIG. 1, a load balancer 140 is networked between the application servers 120A-N and the database servers 150A-N. As will be described, the load balancer 140 operates so as to manage load distribution across the database servers 150A-N or service nodes. In certain instances, to be described herein, the application servers 120A-N can connect directly to the database servers 150A-N via a link 145 so as to bypass the load balancer 140.

Figure 2:
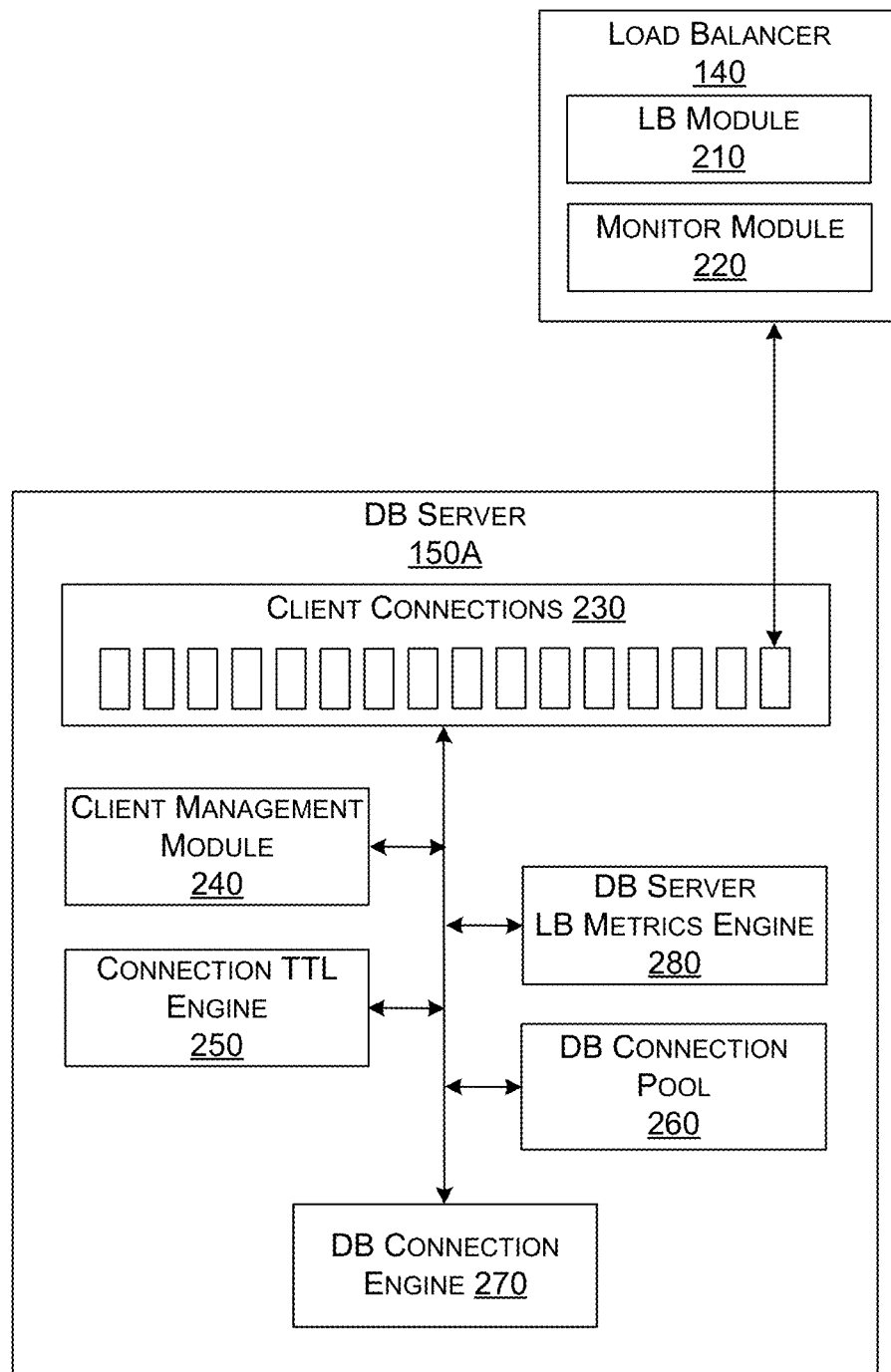
FIG. 2 is a schematic illustration showing example components of the connection service provided within the system of FIG. 1, according to some example embodiments.

FIG. 2 is a high-level schematic illustration showing components comprising the connection service 130 (FIG. 1) including a load balancer 140 and exemplary database server 150A among the plurality of database servers 150A-N (FIG. 1), according to some examples. As illustrated, the load balancer 140 includes a load balancing module 210 and monitor module 220. The load balancing module 210 executes operations to determine a connection to one of the database servers 150A-N (FIG. 1) such that the load will be distributed. The monitor module 220 accesses load balancing metrics data from each of the database servers 150A-N and maintains a current list of which database servers are active. The load balancing module 210 applies a selection algorithm to select one a connection on one of the databases experiencing a lighter load than others. According to an implementation, that connection is identified an assigned connection that can be used by an application server requesting a connection. The load balancer 140 can be a physical load balancer in some implementations, but in some embodiments the load balancer may be functionally implemented at an existing machine, such as a machine of the database servers. In one embodiment, load balancer 140 is implemented as a virtual IP (VIP) type of load balancer to which all application servers send connection requests using an IP address on a dedicated TCP or UDP port number.

Further shown in FIG. 2, the database server 150A maintains a plurality of client connections 230 operable to establish a networked connection with the application servers 120A-N. The database server 150A also includes a client management module 240 operable to handle incoming new client connection requests. The client management module 240 listens for new connection requests, and upon arrival of a connection request, processes authentication, and accepts the connection. In some implementations, the load balancer 140 is linked to a dedicated one of the client connections 230 to communicate with the database server 150A, as illustrated in FIG. 2.

The database server 150A also includes connection TTL engine 250. The TTL engine 250 sets a time-to-live (TTL) for each client connection 230 when the connection is established. Every connection TTL is tracked and timed, and upon TTL expiration the TTL engine notifies the client management module 240. Although the TTL can be set to at any amount of time that suits a particular use environment, where the system 100 supports traffic on e-commerce websites a TTL between 10 and 15 minutes may be suitable. In one embodiment, the TTL engine initially sets a TTL in a randomized fashion, setting the TTL at a random time value within a predefined range, such as a random amount of time between 10 and 15 minutes.

Also shown in FIG. 2, the database server 150A includes a database server metrics engine 280 which monitors one or more metrics considered in determining a current load level of the database server 150A. In an embodiment, the metrics engine 280 monitors one at least as CPU utilization of the database server 150A. The metrics engine 280 reports this information to the monitor module 220 of the load balancer 140. In some implementations, metrics engine 280 sends reports of metrics on a periodic heartbeat interval. The heartbeat interval can be set at any suitable period, e.g., 1 second.

The database server 150A also includes a database connection pool 260 having a number of database connections, including open connections and connections in use, as well as a database connection engine 270, which operates to manage the database connections and to adjust connections in the database connection pool 260. When the database server 150A receives a data request on one of the client connections 230 from an application server to retrieve query data from databases 160A-N (FIG. 1), the database connection engine 270 serves an open database connection from the database connection pool 260 so that the database connection can be used to receive query data from one of the databases 160A-N. The database connection engine 270 also operates to open and close new database connections as needed to handle current or anticipated traffic, and it multiplexes requests for resources over shared connections.

Although FIG. 2 illustrates only one database server 150A, it will be understood that the connection service 130 includes a plurality of database servers 150A-N that, in some implementations, include components similar to those described in connection with database server 150A with reference to FIG. 2. The plurality of database servers 150A-N are, in some implementations, similarly configured to operate the connection service 130 as a distributed application, executing on each of the database servers 150A-N simultaneously to coordinate management of all client connections and database connections. The connection service 130 can thereby leverage the scale of all traffic in system 100 to optimize multiplexing of as many shared connections as possible, and to minimize the need for open database connections at a given time.

Figure 3:
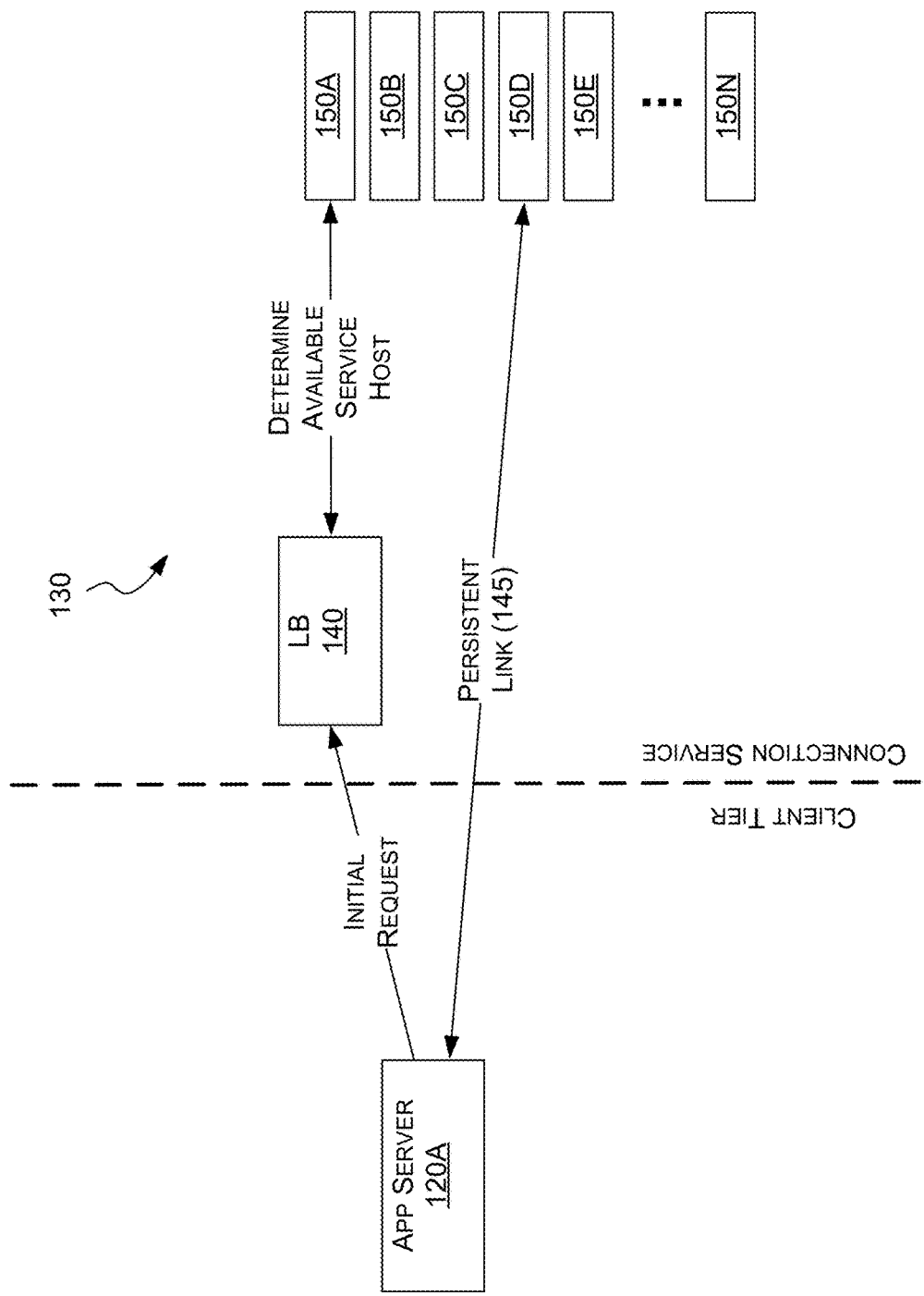
FIG. 3 is a high-level schematic illustrating a handshake between an application server and the connection service according to an embodiment.

FIG. 3 illustrates at a high-level a two-step service discovery handshake between an application server and the connection service according to an embodiment. As a first part of the handshake, when any one of the application servers 120A-N in an application tier of the system, such as application server 120A, needs to request a connection for sending a data request, it contacts the connection service 130 by sending an initial request. Each initial request is addressed to the load balancer 140, which in an implementation, provides a single address point of initial entry.

Upon receiving the initial request, the load balancer 140 evaluates the load across the plurality of database servers 150A-N and determines, based on load metrics data accessed from the database servers 150A-N, a suitable host and assigns a connection accordingly. The load balancer 140 then sends a notification of the connection assignment to the associated database server, for example database server 150D.

A response is sent from the database server 150D with the assigned connection to the application server 120A that sent the initial request. This response identifies the assigned connection, including for example, host/port information. Based on the response, as a second part of the handshake, the application server 120A sends a secondary request to connect directly to the assigned connection at the database server 150D. The database server 150D then establishes the connection with a persistent link 145. In an example implementation, the secondary request and persistent link bypass the load balancer 140, thus only the initial request is addressed to the load balancer 140, and as a result client connections the database servers 150A-N are only balanced upon initialization. The persistent link 145 allows the database server 150D to handle numerous data requests from the application server 120A without further load balancing considerations.

Figure 4A:
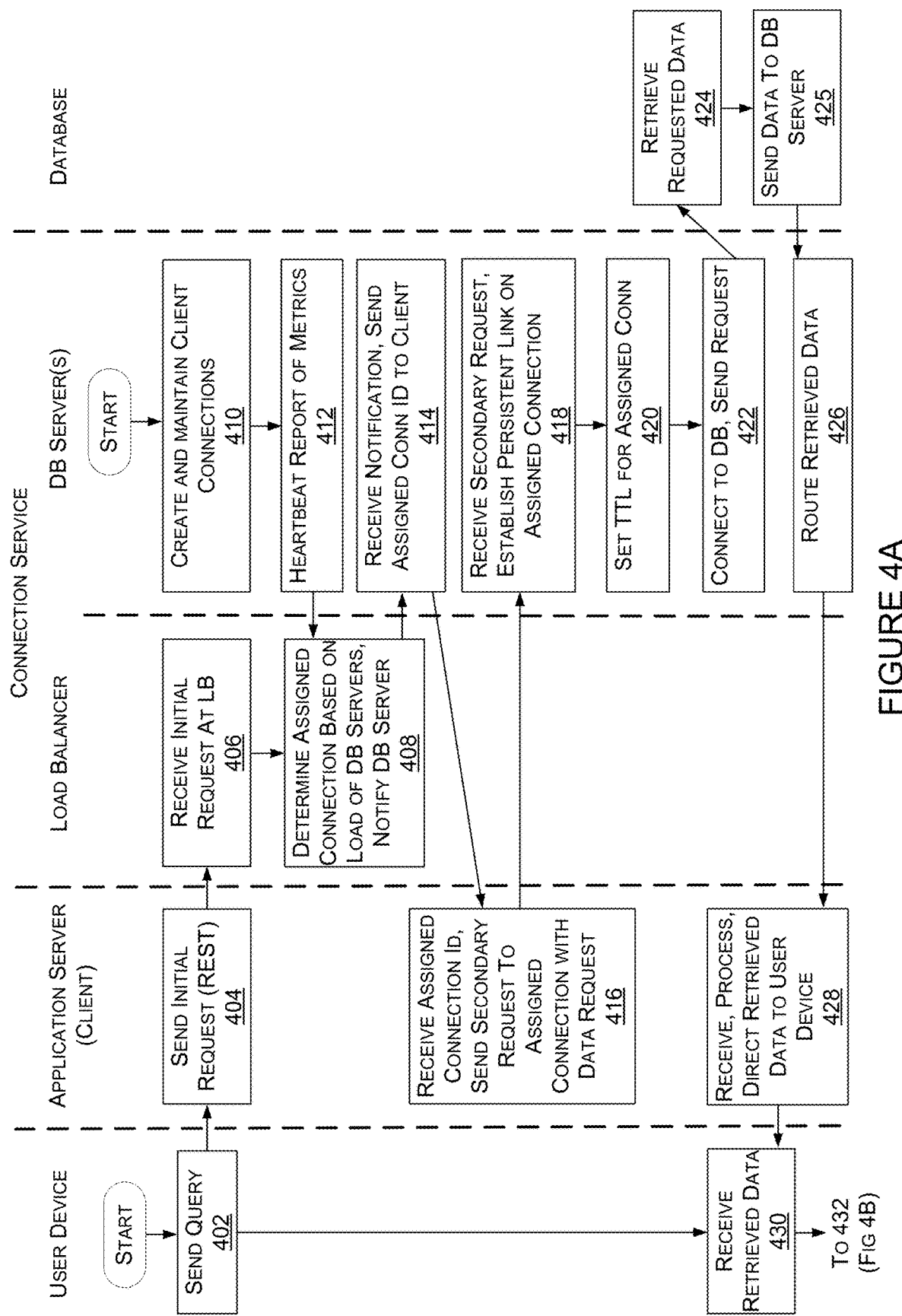
FIGS. 4A and 4B illustrate a flow chart of an example method facilitating a two-step service discovery protocol to connect application servers to the connection service and operations to enable a semi-persistent connection session that results in occasional load rebalancing of the system.
Figure 4B:
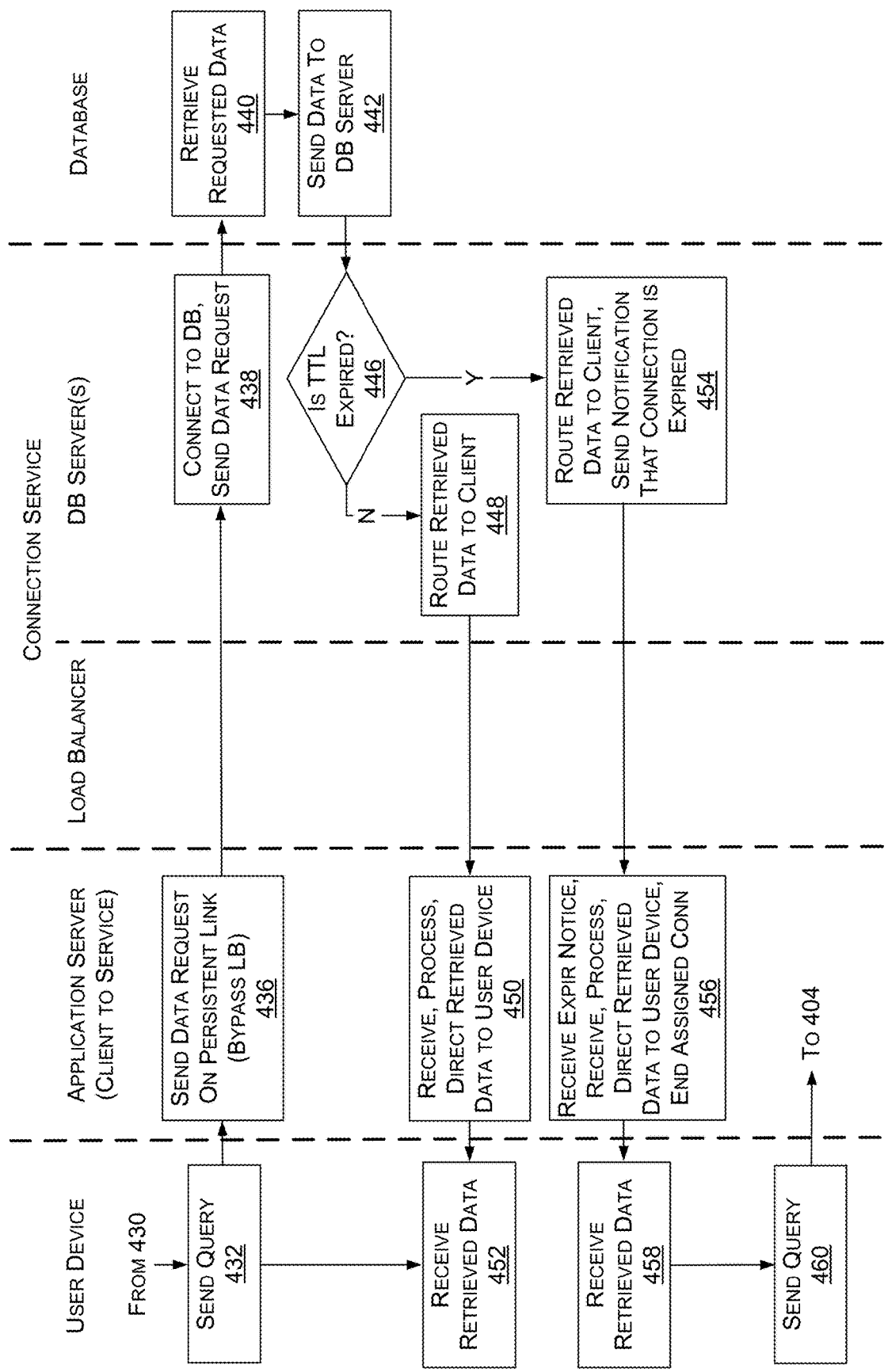

Turning to FIGS. 4A and 4B, a flow diagram according to an example embodiment, illustrating operations to enable discovery of the connection service by clients and to enable, as a further example, occasional load rebalancing of the service nodes. Referring to FIG. 4A, At operation 402, as user (from user devices 105A-N) requests a connection to an application server 120A-N by sending a search request or query. In response, at operation 404, the application server sends an initial request to the connection service, addressed to the load balancer 140. In one example embodiment, the initial request may be an HTTP REST call in which the client provides information pertinent to the use environment, for example, the requesting application and data center of the originating client. At operation 406, the load balancer 140 receives the initial request.

In one embodiment, the database servers 150A-N create and maintain client connections, at operation 410. Also, at operation 412, each of the database servers 150A-N reports load metrics to the load balancer 140, which in some implementations, occurs on a periodic heartbeat interval.

Having received the initial request, the load balancer 140 at operation 408 determines, based on load on the plurality of database servers 150A-N. In some implementations, this determination is made based on load metrics accessed from the database servers 150A-N in the report of operation 412. Further, at operation 408, the load balancer sends a notification to the database server 150A-N of the assigned connection, which is received by the database server at operation 414.

The service sends, to the client, a response to the initial request at operation 414. In one example, the response contains configuration information, including a host and port identifying the assigned connection, which is awaiting a connection request from the application server 120A-N. The response is received by the client at operation 416.

The initial request sent at operation 404, and the resulting operations 406, 408, 414, are the first step of a handshake to enable discovery of the connection service within the system 100 by the application servers 120A-N (FIG. 1).

Also at operation 416, a secondary request is sent from the client to the service. In an embodiment, the secondary request is directed to the assigned connection provided by the service in its response at operation 414, not to the load balancer. At operation 418, the secondary request is received on the assigned connection. At this point, the database server checks authentication and authorization of the request, and if accepted, at operation 418 the database server establishes a persistent connection with the client at the host and port identified in the request. According to one implementation, a TTL is set for the assigned connection at operation 420.

The secondary request sent at operation 416, and the resulting operation 418, are the second step of the handshake to enable discovery of the connection service within the system 100 by the application servers 120A-N (FIG. 1).

In an implementation wherein the secondary request includes a data request, at operation 418 the database server then connects to a database capable of fulfilling the data request. Such data requests can also be sent from the client to the database server on the persistent link to the assigned connection. Also, at operation 424, the request is sent via the database connection to the database. The database retrieves the requested data at operation 424, then sends the retrieved data back to the database server at operation 425. At operation 426, the database server routes the retrieved data to the application server, which at operation 428 receives, processes, and then directs the retrieved data to the originating user device. The user device receives the retrieved data at operation 430, enabling the user device to display the data via a user interface or otherwise utilize the data.

Turning to FIG. 4B, the flow continues at operation 432, in which the user device sends a subsequent query to the application server. Via the persistent link on the client connection to the database server established at operation 418, the application server sends the data request to the database server at operation 436, bypassing the load balancer. At operation 438, the database server connects to a database and sends on the data request. The database retrieves the requested data at operation 440 and sends the data to the database server at operation 442.

Upon receiving the retrieved data resulting from the subsequent data request, operation 446 determines whether the TTL is expired. If the TTL has not expired, the database server routes the retrieved data to the client at operation 448, then at operation 450 the client receives and processes the retrieved data as well as directs the retrieved data to the user device that sent the query at operation 432. If operation 446 determines that the TTL has expired, operation 454 causes the database server to route the retrieved data to the client and also send a notification that the connection is expired. At operation 456, the client receives the notice that previously assigned connection has expired. In one implementation, the notification of operation 454 may be a control flag. The application interprets this flag to signal that the assigned connection is disconnected such that a connection to be reestablished for a next request, i.e., the connection service must be rediscovered. At operation 456 the client also receives the retrieved data, processes it, then directs it to the user device, which receives the data at operation 458. According to an implementation, the control flag is delayed to the completion of multi-request operations such as a large fetch set is complete or transaction is committed.

At operation 460, as a user device sends a new query. Given that the persistent link timed out, operation 460 results going to operation 404, causing the client to again send an initial request to the service via the load balancer.

Figure 5:
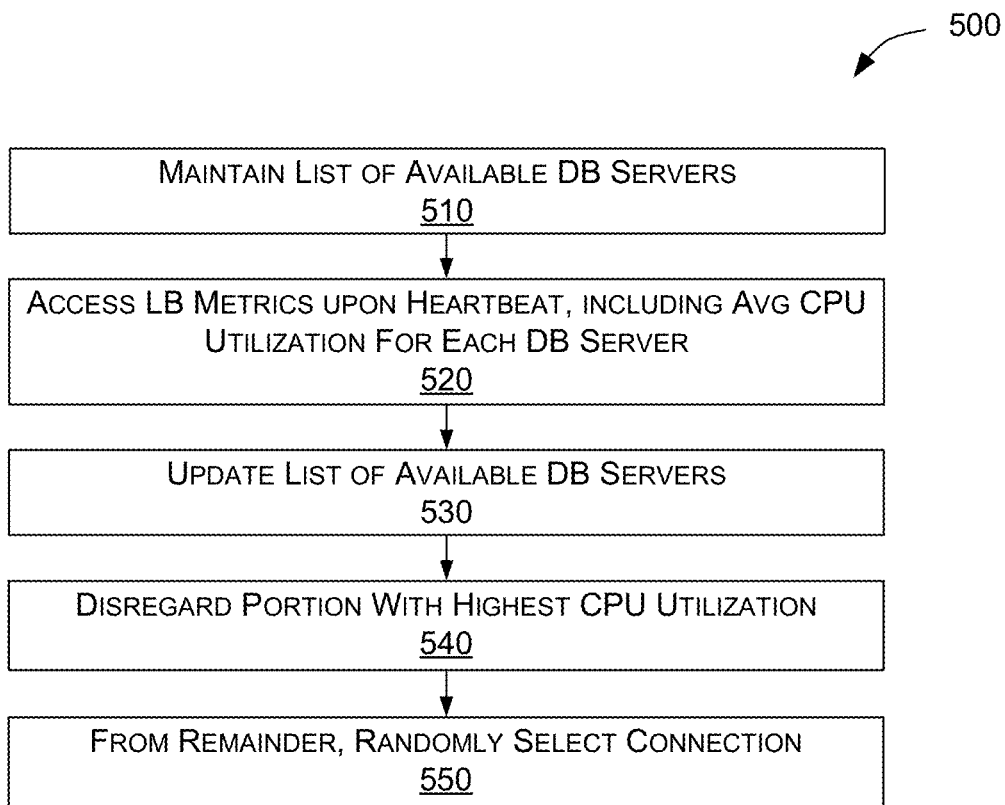
FIG. 5 is a flow chart of a load balancing routine according to one example.

Various techniques may be employed by the load balancer to decide how to decide to select assigned connections so as to distribute the load among the plurality of database servers 150A-N (FIG. 1). FIG. 5 is a flow diagram illustrating a routine 500 of one technique. With reference to FIG. 5, the load balancer 140 (FIGS. 1 and 2) maintains a list of available database servers at operation 510. At operation 520, the load balancer accesses load balancing metrics from active database servers, including for example CPU utilization. Additionally, at operation 520, in some implementations the metrics may be accessed on a heartbeat interval, as described above. The load balancer updates the list of available database servers at operation 530. At operation 540, a portion of the database servers having highest load according to the load balancing metrics, such the servers experiencing the highest CPU utilization, are disregarded from selection. For example, in one exemplary operation, operation 540 disregards a percentage of the plurality of database servers which have the highest CPU utilization. At operation 550, the assigned connection may be randomly selected from a remainder of the database servers.

Figure 6:
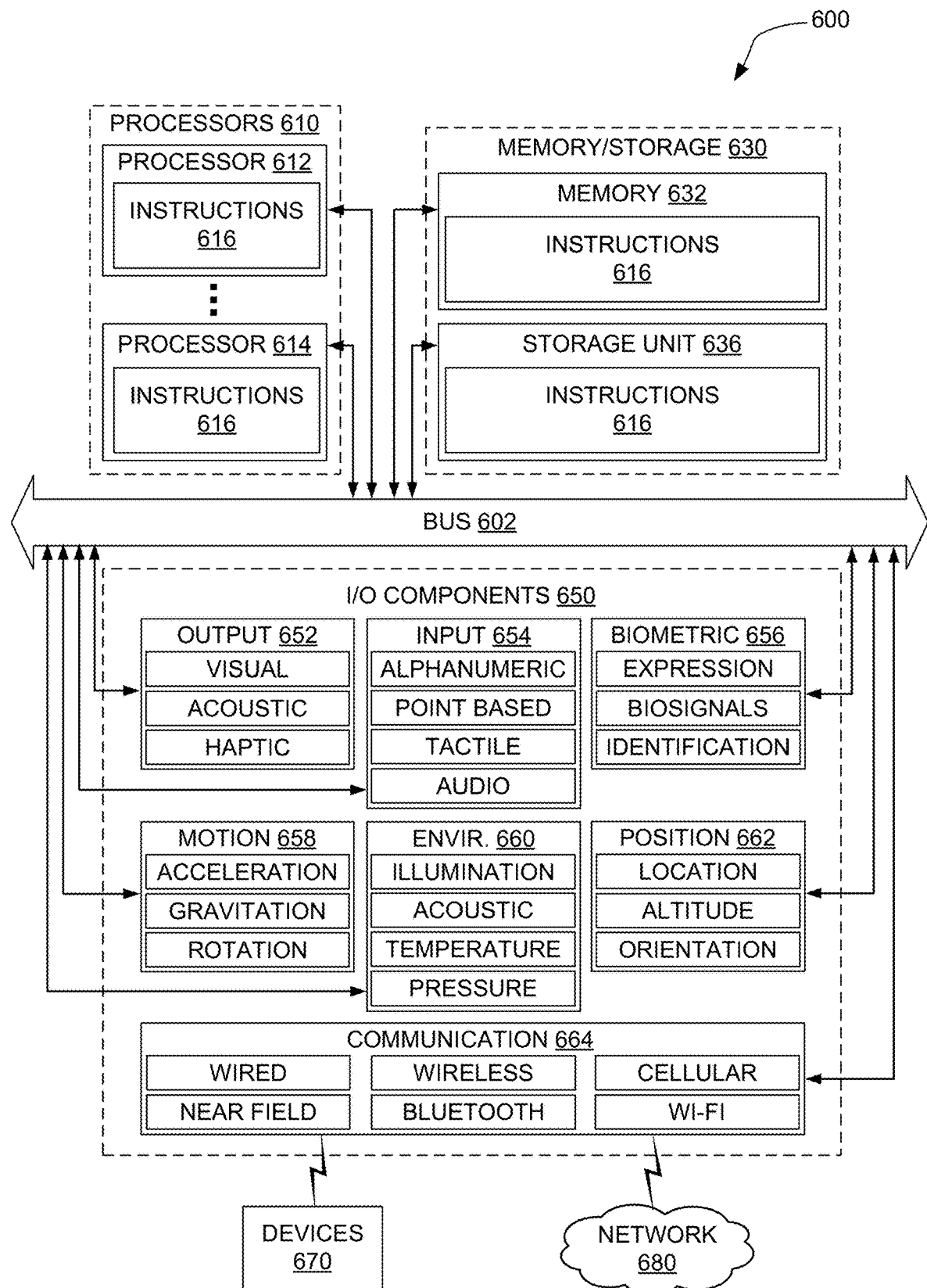
FIG. 6 illustrates a diagrammatic representation of a machine in the form of a computer system within which a set of instructions may be executed for causing the machine to perform any one or more of the methodologies discussed herein, according to an example embodiment.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 816 (e.g., software, a program, an application, an applet, an app, or other executable code) for causing the machine 600 to perform any one or more of the methodologies discussed herein can be executed. For example, the instructions 616 can cause the machine 600 to execute operations of the flow diagrams of FIGS. 4A, 4B and 5. Additionally, or alternatively, the instruction 616 can implement the modules and engines of the load balancer 140 and database server illustrated in FIG. 2. The instructions 616 transform the general, non-programmed machine into a particular machine programmed to carry out the described and illustrated functions in the manner described. In alternative example embodiments, the machine 600 operates as a standalone device or can be coupled (e.g., networked) to other machines. In a networked deployment, the machine 600 may operate in the capacity of a server machine or a client machine in a server-client network environment, or as a peer machine in a peer-to-peer (or distributed) network environment. The machine 800 can comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 600. Further, while only a single machine 800 is illustrated, the term "machine" shall also be taken to include a collection of machines 800 that individually or jointly execute the instructions 616 to perform any one or more of the methodologies discussed herein.

The machine 600 can include processors 610, memory/storage 630, and input/output (I/O) components 650, which can be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor 612 and processor 614 that may execute instructions 616. The term "processor" is intended to include multi-core processor that may comprise two or more independent processors (sometimes referred to as "cores") that can execute instructions contemporaneously. Although FIG. 6 shows multiple processors 810, the machine 600 may include a single processor with a single core, a single processor with multiple cores (e.g., a multi-core processor), multiple processors with a single core, multiple processors with multiples cores, or any combination thereof.

The memory/storage 630 can include a memory 632, such as a main memory. or other memory storage, and a storage unit 636, both accessible to the processors 610 such as via the bus 602. The storage unit 636 and memory 632 store the instructions 616 embodying any one or more of the methodologies or functions described herein. The instructions 616 can also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of the processors 610 are examples of machine-readable media.

As used herein, the term "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. For the purposes of the claims, the phrase "machine-readable medium," "computer storage medium," "computer-readable storage medium," and variations thereof, does not include waves or signals per se.

The I/O components 650 can include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 can include many other components that are not shown in FIG. 6. The I/O components 650 are grouped according to functionality merely for simplifying the following discussion, and the grouping is in no way limiting. In various example embodiments, the I/O components 650 can include output components 652 and input components 654. The output components 652 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 650 can include biometric components 656, motion components 658, environmental components 660, or position components 662 among a wide array of other components. For example, the biometric components 656 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 can include acceleration sensor components (e.g., an accelerometer), gravitation sensor components, rotation sensor components (e.g., a gyroscope), and so forth. The environmental components 660 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 662 can include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 650 may include communication components 664 operable to couple the machine 600 to a network 680 or devices 670 via a coupling 682 and a coupling 672, respectively. For example, the communication components 664 include a network interface component or other suitable device to interface with the network 680. In further examples, communication components 664 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 670 may be another machine or any of a wide variety of peripheral devices (e.g., a peripheral device coupled via a Universal Serial Bus (USB)).

Moreover, the communication components 664 can detect identifiers or include components operable to detect identifiers. For example, the communication components 864 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via, the communication components 864, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 880 can be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a WI-FI® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or other type of cellular or wireless coupling. In this example, the coupling 682 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UNITS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 616 can be transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, the instructions 616 can be transmitted or received using a transmission medium via the coupling 672 (e.g., a peer-to-peer coupling) to devices 670. The term "transmission medium" shall be taken to include any intangible medium that is capable of storing, encoding, or carrying the instructions 616 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these example embodiments without departing from the broader scope of example embodiments of the present disclosure. Such example embodiments of the inventive subject matter may be referred to herein, individually or collectively, by the term "invention" merely for convenience and without intending to voluntarily limit the scope of this application to any single disclosure or inventive concept if more than one is, in fact, disclosed.

The example embodiments illustrated herein are described in sufficient detail to enable those skilled in the art to practice the teachings disclosed. Other example embodiments may be used and derived therefrom, such that structural and logical substitutions and changes may be made without departing from the scope of this disclosure. The Detailed Description, therefore, is not to be taken in a limiting sense, and the scope of various example embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data store are somewhat arbitrary, and particular operations are illustrated in a context of specific illustrative configurations. Other allocations of functionality are envisioned and may fall within a scope of various example embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of example embodiments of the present disclosure as represented by the appended claims. The specification and drawings are, accordingly, to be regarded in an illustrative rather than a restrictive sense.

The disclosure presented herein may be considered in view of the following examples.

Example A: A computer-implemented method to enable discovery of a connection service by clients communicating data requests, the method comprising: maintaining, on a plurality of database servers, a plurality of client connections available for connection to a plurality of clients; receiving from a client among the plurality of clients, at a load balancer, an initial request to be assigned a connection to one of the database servers, the database servers operating a connection service managing connections between the plurality of clients and a plurality of databases; accessing, by the load balancer, metrics data reflecting load conditions on the plurality of database servers; determining, by the load balancer, an assigned connection to one of the database servers based on the load conditions; sending, from the database server having the assigned connection, identification of the assigned connection to the client; receiving at the assigned connection on the database server, a secondary request from the client; establishing, on the assigned connection, a persistent link between the client and the database server, bypassing the load balancer; and receiving at least one data request from the client on the persistent link.

Example B: The method of Example A, further comprising: setting a time-to-live (TTL) for the assigned connection.

Example C: The method of Examples A and B, further comprising: connecting, while TTL has not expired, the data request to a database capable of fulfilling the request; and routing data retrieved from the database in response to the data request to the client on the assigned connection.

Example D: The method of Examples A and B, further comprising: connecting, if the TTL has expired, the data request to a database capable of fulfilling the request; routing data retrieved from the database in response to the data request to the client on the assigned connection; and sending a notification to the client that the connection has expired.

Example E: The method of Examples A, B and D, further comprising: receiving another initial request from the client at the load balancer.

Example F: The method of Example A, wherein determining, by the load balancer, an assigned connection to one of the database servers based on the load conditions: maintaining a list of active database servers; accessing load balancing metrics reflecting at least CPU load of each of the database servers; eliminating from selection a proportion of the database servers experiencing the highest load; selecting the assigned connection randomly from a remainder of the list one of the database servers having available connections.

Example G: The method of Example A, wherein accessing metrics data occurs in periodic heartbeat.

Example H: The method of Example A, wherein the identification of the assigned connection from the load balancer to the client includes host and port information.

Example I: A system comprising: a load balancer; and a plurality of database servers; wherein the load balancer includes one or more processors and a memory in communication with the processor, the memory having computer-readable instructions stored thereon which, when executed by the processor, cause the load balancer to: receive from a client among a plurality of clients an initial request to be assigned a connection to one of the database servers; access metrics data reflecting load conditions on the plurality of database servers; and determine, from among a plurality of client connections at the database servers, an assigned connection to one of the database servers based on the load conditions of the plurality of database servers; wherein each of the database servers includes one or more processors and a memory in communication with the processor, the memory having computer readable instructions stored thereon which, when executed by the processor, cause the database server to: maintain the plurality of client connections available for connection to the plurality of clients; send identification of the assigned connection to the client as determined by the load balancer; receive a secondary request at the assigned connection; establish, on the assigned connection, a persistent link between the client and the database server, bypassing the load balancer; and receive at least one data request from the client on the persistent link.

Example J: The system of Example I, wherein the computer-readable instructions of the database server further cause the database server to set a time-to-live (TTL) for the assigned connection.

Example K: The system of Examples I and J, wherein the computer-readable instructions of the database server further cause the database server to: connect, while the TTL has not expired, the data request to a database capable of fulfilling the request; and route data retrieved from the database in response to the data request to the client on the assigned connection.

Example L: The system of Examples I and J, wherein the instructions of the database server further cause the database server to: connect, if the TTL has expired, the data request to a database capable of fulfilling the request; route data retrieved from the database in response to the data request to the client on the assigned connection; and send a notification to the client that the connection has expired.

Example M: The system of Examples I, J and L, wherein the instructions of the database server further cause the database server to: receive another initial request from the client at the load balancer.

Example N: The system of Example I, wherein the instructions of the load balancer further cause the load balancer to: maintain a list of active database servers; eliminate from selection a proportion of the database servers experiencing the highest load; select the assigned connection randomly from a remainder of the list one of the database servers having available connections.

Example O: The system of Example I, wherein to access load balancing metrics occurs in a periodic heartbeat.

Example P: A computer readable storage medium having computer-executable instructions stored thereupon, which, when executed by a processor of a computing device, cause the computing device to: maintain the plurality of client connections available for connection to a plurality of clients; report, to a load balancer, metrics data reflecting load conditions on the plurality of database servers, such that the load balancer can select an assigned connection based on the load conditions; notify a client requesting a connection of an assigned connection identification on the database server; receive, on the assigned connection, a request from a client; establish, on the assigned connection, a persistent link between the client and the database server, bypassing the load balancer; and receive at least one data request from the client on the persistent link.

Example Q: The computer-readable medium of Example P, wherein the instructions further cause the computing device to set a time-to-live (TTL) for the assigned connection.

Example R: The computer-readable medium of Examples P and Q, wherein the instructions further cause the computing device to: connect, while the TTL has not expired, the data request to a database capable of fulfilling the request; and route data retrieved from the database in response to the data request to the client on the assigned connection.

Example S: The computer-readable medium of Examples P, wherein the instructions further cause the computing device to: connect, if the TTL has expired, the data request to a database capable of fulfilling the request; route data retrieved from the database in response to the data request to the client on the assigned connection; and send a notification to the client that the connection has expired.

Example T: The computer-readable medium of Examples P and S, wherein the instructions further cause the computing device to: receive another initial request from the client at the load balancer.

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method to enable discovery of a connection service by clients communicating data requests, the method comprising:
    maintaining, on a plurality of database servers, a plurality of client connections available for connection to a plurality of clients;
    receiving from a client among the plurality of clients, at a load balancer, an initial request to be assigned a connection to one of the database servers, the database servers operating a connection service managing connections between the plurality of clients and a plurality of databases;
    accessing, by the load balancer, metrics data reflecting load conditions on the plurality of database servers;
    determining, by the load balancer, an assigned connection to one of the database servers based on the load conditions;
    sending, from the database server having the assigned connection, identification of the assigned connection to the client;
    receiving at the assigned connection on the database server, directly from the client, a secondary request;
    establishing, responsive to receiving the secondary request directly from the client and on the assigned connection on the database server, a persistent link between the client and the database server, bypassing the load balancer; and
    receiving at least one data request from the client on the persistent link.

2. The method of claim 1, further comprising setting a time-to-live (TTL) for the assigned connection.

3. The method of claim 2, further comprising:
    connecting, while TTL has not expired, the at least one data request to a database capable of fulfilling the request; and
    routing data retrieved from the database in response to the at least one data request to the client on the assigned connection.

4. The method of claim 2, further comprising:
    connecting, if the TTL has expired, the at least one data request to a database capable of fulfilling the at least one data request;
    routing data retrieved from the database in response to the at least one data request to the client on the assigned connection; and
    sending a notification to the client that the assigned connection has expired.

5. The method of claim 4, further comprising receiving another initial request from the client at the load balancer.

6. The method of claim 1, wherein determining the assigned connection to one of the database servers based on the load conditions further comprises:
    maintaining a list of active database servers;
    accessing load balancing metrics reflecting at least CPU load of each of the database servers;
    eliminating from selection a proportion of the database servers experiencing the highest load; and
    selecting the assigned connection randomly from a remainder of the list one of the database servers having available connections.

7. The method of claim 1, wherein accessing the metrics data occurs in f! periodic heartbeat interval.

8. The method of claim 1, wherein the identification of the assigned connection to the client includes host and port information.

9. The method of claim 1, wherein the secondary request is received at the assigned connection on the database server without being routed through the load balancer.

10. A system comprising:
    a load balancer; and
    a plurality of database servers;
    wherein the load balancer includes one or more processors and a memory in communication with the processor, the memory having computer-readable instructions stored thereon which, when executed by the processor, cause the load balancer to:
        receive from a client among a plurality of clients an initial request to be assigned a connection to one of the database servers;
        access metrics data reflecting load conditions on the plurality of database servers; and
        determine, from among a plurality of client connections at the database servers, an assigned connection to one of the database servers based on the load conditions of the plurality of database servers;
    wherein each of the database servers includes one or more processors and a memory in communication with the processor, the memory having computer readable instructions stored thereon which, when executed by the processor, cause the database server to:
        maintain the plurality of client connections available for connection to the plurality of clients;
        send identification of the assigned connection to the client as determined by the load balancer;
        receive, directly from the client, a secondary request at the assigned connection;
        establish, responsive to receiving the secondary request directly from the client and on the assigned connection, a persistent link between the client and the database server, bypassing the load balancer; and
        receive at least one data request from the client on the persistent link.

11. The system of claim 10, wherein the computer-readable instructions of the database server further cause the database server to set a time-to-live (TTL) for the assigned connection.

12. The system of claim 11, wherein the computer-readable instructions of the database server further cause the database server to:
    connect, while the TTL has not expired, the at least one data request to a database capable of fulfilling the at least one data request; and
    route data retrieved from the database in response to the at least one data request to the client on the assigned connection.

13. The system of claim 11, wherein the instructions of the database server further cause the database server to:
    connect, if the TTL has expired, the at least one data request to a database capable of fulfilling the at least one data request;

route data retrieved from the database in response to the at least one data request to the client on the assigned connection; and send a notification to the client that the assigned connection has expired.

14. The system of claim 13, wherein the instructions of the database server further cause the database server to receive another initial request from the client at the load balancer.

15. The system of claim 10, wherein the instructions of the load balancer further cause the load balancer to:

maintain a list of active database servers;

eliminate from selection a proportion of the database servers experiencing the highest load; and select the assigned connection randomly from a remainder of the list one of the database servers having available connections.

16. The system of claim 10, wherein access of the metrics data occurs in a periodic heartbeat.

17. A computer readable storage medium, not including waves or signals per se, having computer-executable instructions stored thereupon, which, when executed by a processor of a computing device, cause the computing device to:

maintain a plurality of client connections available for connection to a plurality of clients;

report, to a load balancer, metrics data reflecting load conditions on the plurality of database servers, such that the load balancer can select, responsive to receiving, from a client among the plurality of clients, an initial request at the load balancer, an assigned connection based on the load conditions;

notify the client requesting a connection via the initial request, of an assigned connection identification on the database server;

receive, on the assigned connection, directly from the client, a secondary request;

establish, responsive to receiving the secondary request directly from the client and on the assigned connection, a persistent link between the client and the database server, bypassing the load balancer; and receive at least one data request from the client on the persistent link.

18. The computer-readable medium of claim 17, wherein the instructions further cause the computing device to set a time-to-live (TTL) for the assigned connection.

19. The computer-readable medium of claim 18, wherein the instructions further cause the computing device to:

connect, while the TTL has not expired, the at least one data request to a database capable of fulfilling the at least one data request; and route data retrieved from the database in response to the at least one data request to the client on the assigned connection.

20. The computer-readable medium of claim 17, wherein the instructions further cause the computing device to:

connect, if the TTL has expired, the at least one data request to a database capable of fulfilling the at least one data request;

route data retrieved from the database in response to the at least one data request to the client on the assigned connection; and send a notification to the client that the assigned connection has expired.

* * * * *